United States Patent
Haman (10) Patent No.: US 9,981,372 B2
(45) Date of Patent: May 29, 2018

(54) RECIPROCATING TOOL WITH FLUID DRIVEN COUNTERWEIGHT

(71) Applicants: Robert Bosch Tool Corporation, Chicago, IL (US); Robert Bosch GmbH, Stuttgart (DE)

(72) Inventor: Brian K. Haman, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1140 days.

(21) Appl. No.: 14/141,553

(22) Filed: Dec. 27, 2013

(65) Prior Publication Data
US 2014/0182871 A1   Jul. 3, 2014

Related U.S. Application Data

(60) Provisional application No. 61/747,759, filed on Dec. 31, 2012.

(51) Int. Cl.
*B25D 17/00* (2006.01)
*B25F 5/00* (2006.01)
(Continued)

(52) U.S. Cl.
CPC ............ *B25F 5/006* (2013.01); *B23D 49/165* (2013.01); *B23D 51/16* (2013.01)

(58) Field of Classification Search
CPC .............. B23D 51/18; B25D 2250/231; B25D 2250/035; B25D 11/062; B25D 2211/061; B25D 2217/0084
(Continued)

(56) References Cited

U.S. PATENT DOCUMENTS

| | | | | |
|---|---|---|---|---|
| 1,800,465 A | * | 4/1931 | Miller | B25D 11/06 173/14 |
| 4,442,906 A | * | 4/1984 | Simpson | B25D 11/005 173/122 |

(Continued)

FOREIGN PATENT DOCUMENTS

WO    2004082897 A1    9/2004

OTHER PUBLICATIONS

International Search Report and Written Opinion corresponding to PCT Application No. PCT/US2013/078171, dated Jun. 5, 2014 (11 pages).

*Primary Examiner* — Andrew M Tecco
(74) *Attorney, Agent, or Firm* — Maginot, Moore & Beck LLP (57) ABSTRACT

In one embodiment, a reciprocating tool includes a first variable volume fluid chamber, a second variable volume fluid chamber in fluid communication with the first variable volume fluid chamber, a plunger configured to modify the volume of the first variable volume fluid chamber by movement generally in a first direction along a plunge axis such that a portion of a fluid moves from one of the first and second variable volume fluid chamber to the other of the first and second variable volume fluid chamber, a counterweight configured such that the movement of the portion of the fluid results in a movement of the counterweight generally in a second direction along the plunge axis, the second direction opposite to the first direction, and a chuck assembly supported by the plunger.

20 Claims, 8 Drawing Sheets

(51) Int. Cl.
　　　*B23D 49/16*　　　(2006.01)
　　　*B23D 51/16*　　　(2006.01)

(58) Field of Classification Search
　　　USPC .......................................................... 173/201
　　　See application file for complete search history.

(56) References Cited

U.S. PATENT DOCUMENTS

| | | | |
|---|---|---|---|
| 5,025,562 A * | 6/1991 | Palm | B23D 49/162 |
| | | | 30/392 |
| 5,079,844 A | 1/1992 | Palm | |
| 5,218,767 A * | 6/1993 | Wells | B23D 51/18 |
| | | | 30/277.4 |
| RE35,258 E | 6/1996 | Palm | |
| 6,119,796 A * | 9/2000 | Schmid | B25D 11/125 |
| | | | 173/118 |
| 6,971,455 B2 * | 12/2005 | Shibata | B25D 16/00 |
| | | | 173/109 |
| 7,707,729 B2 | 5/2010 | Moreno | |
| 7,806,201 B2 | 10/2010 | Aoki | |
| 2004/0108123 A1 * | 6/2004 | Shibata | B25D 16/00 |
| | | | 173/201 |
| 2006/0076154 A1 | 4/2006 | Aoki | |
| 2008/0277128 A1 | 11/2008 | Satou | |
| 2010/0175903 A1 * | 7/2010 | Ikuta | B25D 11/125 |
| | | | 173/2 |
| 2010/0307783 A1 | 12/2010 | Baumann et al. | |
| 2011/0155405 A1 | 6/2011 | Aoki | |
| 2012/0031638 A1 | 2/2012 | Kamegai et al. | |

\* cited by examiner

RECIPROCATING TOOL WITH FLUID DRIVEN COUNTERWEIGHT

This application claims the benefit of U.S. Provisional Application No. 61/747,759 filed Dec. 31, 2012, the entirety of which is incorporated herein by reference.

FIELD

This disclosure relates to power hand tools and more specifically to reciprocating power hand tools.

BACKGROUND

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner. Various approaches have been developed which translate the rotational motion into reciprocating motion. A common approach is the incorporation of a wobble plate drive.

A "wobble plate" assembly is a configuration wherein a shaft has an angled portion on which an arm is mounted through a ball bearing assembly. The arm is slidingly positioned within a portion of a plunger assembly. As the angled portion of the shaft rotates, the arm translates the rotation of the shaft into a reciprocating movement of the plunger assembly. One example of a reciprocating tool which incorporates a wobble plate drive is U.S. Pat. No. 7,707,729, which issued on May 4, 2010, the entire contents of which are herein incorporated by reference.

As the plunger assembly moves along an axis, a significant amount of momentum is created. All of this momentum is absorbed by the tool as the plunger assembly reverses direction. Thus, a user of a reciprocating tool incorporating a wobble plate drive must contend with a powerfully vibrating device. In order to make such reciprocating tools more controllable, reciprocating tools such as the device in the '729 patent incorporate a counterweight which is driven by a secondary wobble plate in a direction opposite to the direction of the plunger assembly. While the incorporation of a secondary wobble plate and counterweight is effective, such systems can be bulky and expensive.

Other devices for changing rotational movement to reciprocating movement include scotch yoke mechanism and crank sliders. Such devices are disclosed in U.S. Pat. No. 6,357,125 which issued on Mar. 19, 2002, and U.S. Patent Publication No. 2008/0134855, which was published on Jun. 12, 2008, the entire contents of which are both herein incorporated by reference. These systems also suffer from increased bulkiness.

A need exists for a reciprocating tool which reduces vibration of a wobble plate drive. A further need exists for a reciprocating tool which reduces vibration of a wobble plate drive which does not rely upon bulky assemblies. A system which reduces vibrations in a reciprocating tool while reducing costs associated with vibration reduction would be further beneficial.

SUMMARY

In one embodiment, a reciprocating tool includes a first variable volume fluid chamber, a second variable volume fluid chamber in fluid communication with the first variable volume fluid chamber, a plunger configured to modify the volume of the first variable volume fluid chamber by movement generally in a first direction along a plunge axis such that a portion of a fluid moves from one of the first and second variable volume fluid chamber to the other of the first and second variable volume fluid chamber, a counterweight configured such that the movement of the portion of the fluid results in a movement of the counterweight generally in a second direction along the plunge axis, the second direction opposite to the first direction, and a chuck assembly supported by the plunger.

In another embodiment, a reciprocating tool includes a first variable volume fluid chamber, a second variable volume fluid chamber in fluid communication with the first variable volume fluid chamber through a fluid port, a plunger configured to modify the volume of the first variable volume fluid chamber by movement generally in a first direction along a plunge axis such that a portion of a fluid moves from one of the first and second variable volume fluid chamber to the other of the first and second variable volume fluid chamber, a drive assembly configured to force the plunger along the plunge axis; and a counterweight configured such that the movement of the portion of the fluid results in a movement of the counterweight generally in a second direction along the plunge axis, the second direction opposite to the first direction.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 1:
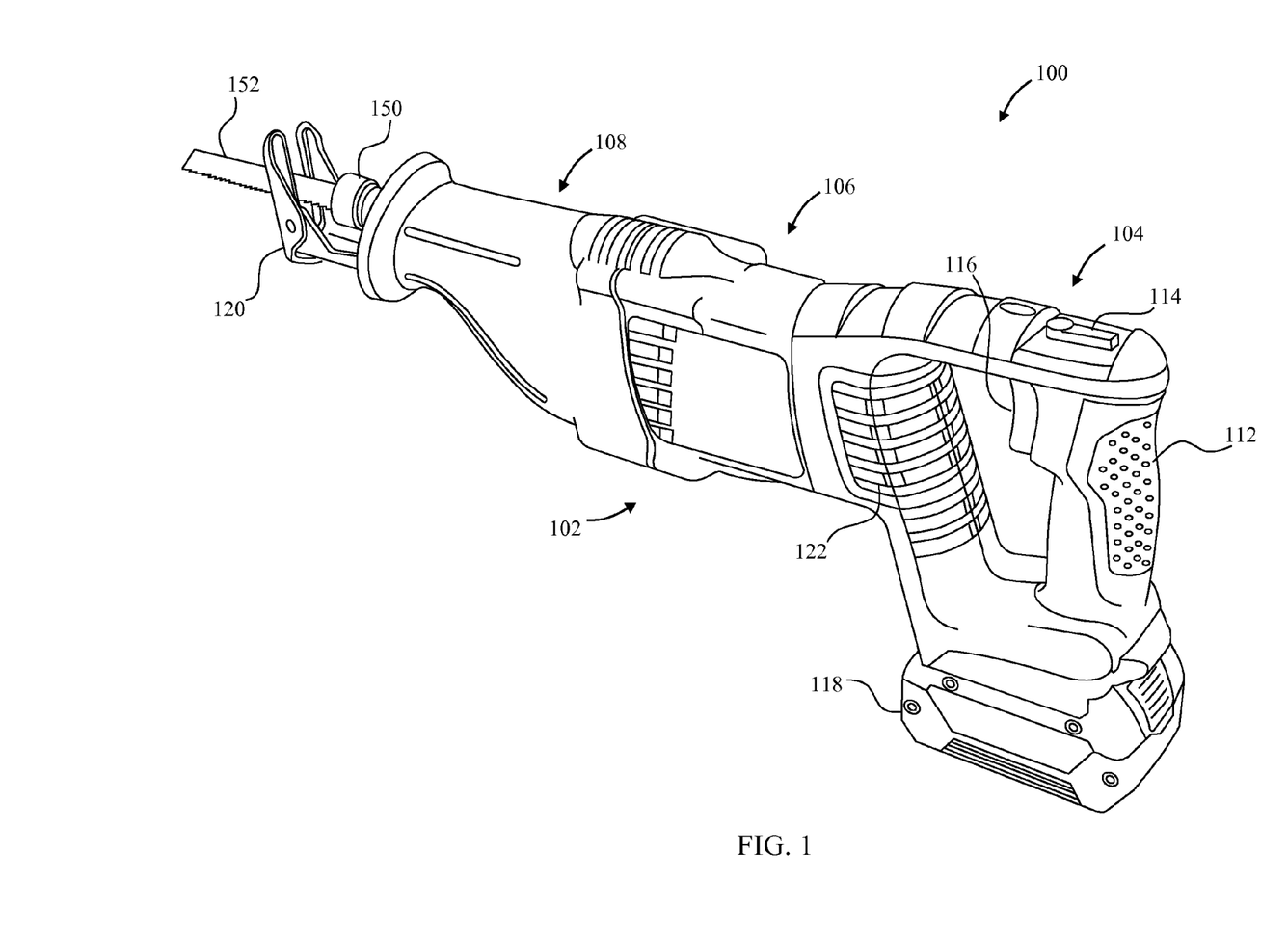
FIG. 1 depicts a side perspective view of a reciprocating tool incorporating an fluid-driven counterweight in accordance with principles of the disclosure.

FIG. 1 depicts a reciprocating saw 100 including an outer housing 102 which includes a handle portion 104, a motor portion 106, and a nose portion 108. The handle portion 104 includes a grip 112, a dual-speed switch 114, and a variable speed trigger 116. The handle portion 104 is configured to removably receive a battery pack 118 which in some embodiments is replaced by a corded power supply.

The nose portion 108 is shaped to allow a user to grip the tool 100 while the tool 100 is in use and in some embodiments is made from a rubber material. A foot plate assembly 120 is located forwardly of the nose portion 108.

Figure 2:
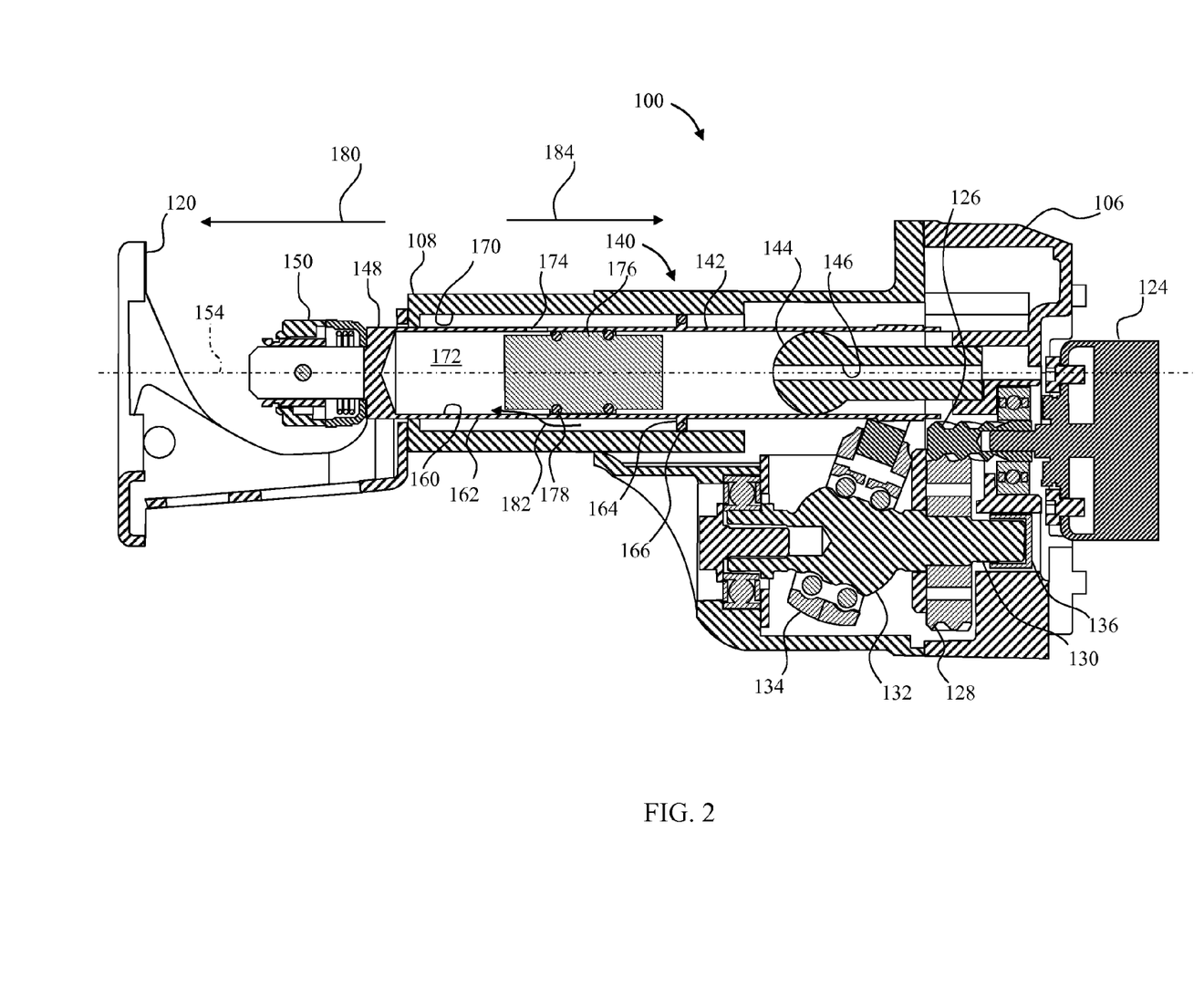
FIG. 2 depicts a side cross-sectional view of the tool of FIG. 1 showing a wiper flange extending from a plunger with the plunger assembly in a rearward position and a counterweight located within the plunger.

The motor portion 106 includes a number of ventilation ports 122 which are used to provide cooling air to a motor 124 shown in FIG. 2. The motor 124 rotatably drives an output shaft 126 which is engaged with a gear 128. The gear 128 is fixedly connected to a drive shaft 130 which includes an angled portion 132. A wobble plate assembly 134 is rotatably positioned on the angled portion 132 and configured to drive a plunger assembly 140 in a reciprocating motion. The drive shaft 130 is supported at one end by a needle bearing 136.

The plunger assembly 140 includes a plunger 142 which is supported by a rear bushing 144. A vent 146 is defined through the rear bushing 144. A forward end portion 148 of the plunger 142 extends through the nose portion 108 and supports a chuck assembly 150. The chuck assembly 150 is configured to removably support a saw blade 152 (see FIG. 1). As discussed in further detail below, the plunger 142 is configured to drive the saw blade 152 along a plunger axis 154.

The plunger 142 includes an inner wall 160 and an outer wall 162. A wiper flange 164 extends outwardly from the outer wall 162 and is sealingly and slidingly engaged with the nose portion 108 by an O-ring 166. The nose portion 108, wiper flange 164, and outer wall 162 define a first fluid chamber 170 which extends about the plunger 142 and is in fluid communication with a second fluid chamber 172 defined in part by the inner wall 160 through one or more fluid ports 174. The second fluid chamber 172 is further defined by a counterweight 176 located within the plunger 142. The counterweight 176 is slidingly and sealingly engaged with the inner wall 160 by one or more O-rings 178.

Operation of the reciprocating saw 100 is described with initial reference to FIG. 2. In FIG. 2, the plunger 142 is at its most rearward location and the counterweight 176 is at its most forward location. A user then applies power to the motor 124 from the battery pack 118 by selecting a speed range with the dual-speed switch 114 and depressing the variable speed trigger 116. As power is applied to the motor 124, the output shaft 126 rotates.

Rotation of the shaft 126 forces the gear 128 to rotate and, since the gear is fixedly connected to the drive shaft 130, the drive shaft 130 rotates as well. The wobble plate assembly 134 is constrained against movement orthogonal to the plunger axis 154 by the configuration of the plunger assembly 140. Accordingly, as the drive shaft 130 rotates from the orientation depicted in FIG. 2 to the orientation of FIG. 3, the top of the wobble plate assembly 134 pivots forwardly, in the direction of the arrow 180 of FIG. 2.

Movement of the top of the wobble plate assembly 134 in the direction of the arrow 180 forces the plunger assembly 140 including the plunger 142 to also move in the direction of the arrow 180. As the plunger 142 moves in the direction of the arrow 180, the wiper flange 164 reduces the volume of the first fluid chamber 170. Consequently, pressure increases within the first fluid chamber 170. The increased pressure in the first fluid chamber 170 forces fluid, which in one embodiment is air, out of the first fluid chamber 170, through the fluid ports 174, and into the lower pressure second fluid chamber 172 as indicated by the arrow 182.

As the amount of fluid within the second fluid chamber 172 increases, the pressure within the plunger 142 forwardly of the counterweight 176 increases since the fluid is relatively non-compressible at the pressures used. The pressure within the plunger 142 rearwardly of the counterweight 176, however, stays constant since the counterweight 176 is sealingly engaged with the inner wall 160 by the O-ring 178. A pressure difference is thus created across the counterweight 176 which forces the counterweight 176 to move in the direction of the arrow 184, directly opposite to the arrow 180.

As the counterweight 176 moves rearwardly, in the direction of the arrow 184, the area within the plunger 142 rearwardly of the counterweight 176 decreases. Pressure within the decreased area of the plunger 142 does not change, however, since that area is vented by the vent 146.

Thus, the combined volume of the first fluid chamber 170 and the second fluid chamber 172 remains constant. Since the volume of the first fluid chamber 170 is decreasing, the counterweight 176 is forced to move so as to increase the volume of the second fluid chamber 172. Consequently, as the plunger assembly 140 moves forwardly, the counterweight 176 moves rearwardly, thereby cancelling effects of the forward movement of the plunger assembly 140.

Figure 3:
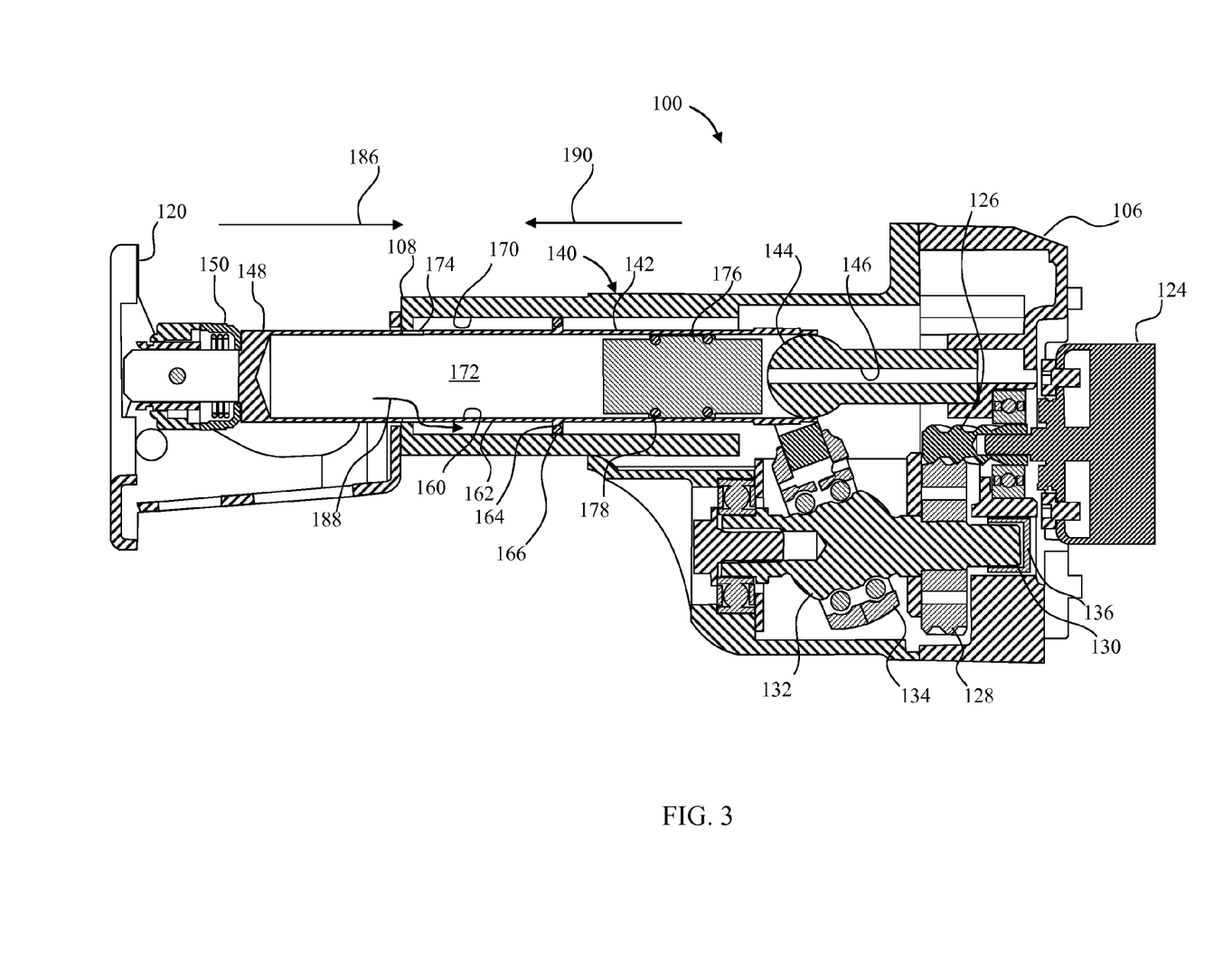
FIG. 3 depicts a side cross-sectional view of the tool of FIG. 1 with the plunger assembly in a forward position.

The above described sequence continues until the configuration of FIG. 3 is realized. In FIG. 3, the wobble plate assembly 134 has forced the plunger assembly 140 to its most forward position, while the counterweight 176 has been forced rearwardly to its most rearward position. As the motor 124 continues to rotate, the above described movement of the wobble plate assembly 134 and the plunger assembly 140 is reversed. As the plunger 142 moves in the direction of the arrow 186, the wiper flange 164 causes the volume of the first fluid chamber 170 to enlarge, thereby creating a relative vacuum. Consequently, fluid flows from the second fluid chamber 172 into the first fluid chamber 170 as indicated by the arrow 188.

As the amount of fluid within the second fluid chamber 172 decreases, the pressure within the second fluid chamber 172 forwardly of the counterweight 176 decreases. The pressure within the plunger 142 rearwardly of the counterweight 176, however, stays constant since the counterweight 176 is sealingly engaged with the inner wall 160 by the O-ring 166. A pressure difference is thus created across the counterweight 176 which forces the counterweight 176 to move in the direction of the arrow 190, directly opposite to the arrow 186.

As the counterweight 176 moves forwardly, in the direction of the arrow 190, the area within the plunger 142 rearwardly of the counterweight 176 increases. Pressure within the increased area of the plunger 142 does not change, however, since that area is vented by the vent 146. Consequently, as the plunger assembly 140 moves rearwardly, the counterweight 176 moves forwardly, thereby cancelling effects of the rearward movement of the plunger assembly 140. Accordingly, vibrations caused by the movement of the plunger assembly 140 are automatically countered by movement of the counterweight 176.

Figure 4:
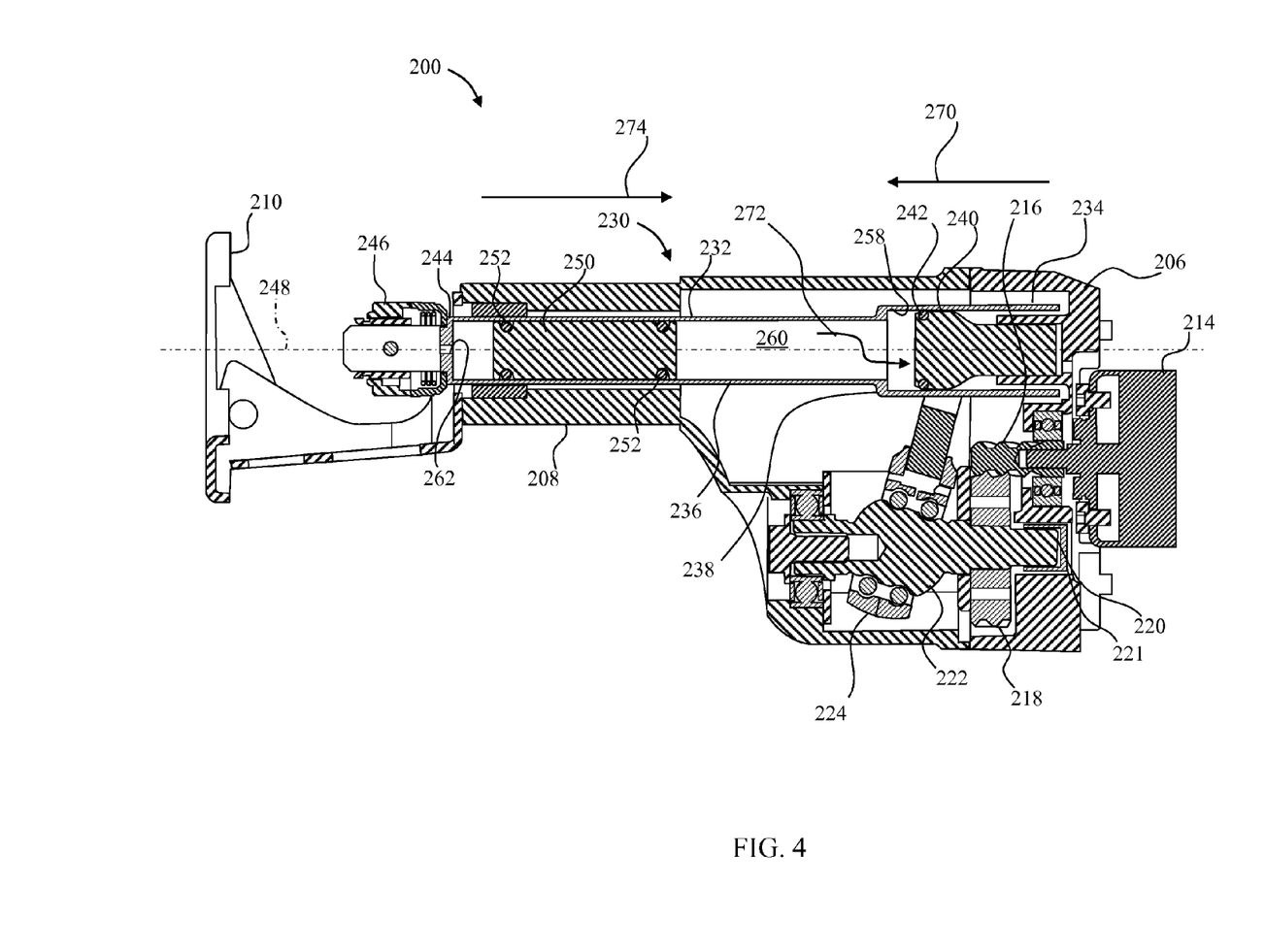
FIG. 4 depicts a side cross-sectional view of a reciprocating tool showing two variable volume fluid chambers within a plunger with the plunger assembly in a rearward position and a counterweight located within the plunger.

FIG. 4 depicts a portion of a reciprocating saw 200 which is similar to the reciprocating saw 100. Like the reciprocating saw 100, the reciprocating saw 200 includes a motor housing portion 206, and a nose housing portion 208. A foot plate assembly 210 is located forwardly of the nose portion 208. A motor 214 rotatably drives an output shaft 216 which is engaged with a gear 218. The gear 218 is fixedly connected to a drive shaft 220 which includes an angled portion 222. A wobble plate assembly 224 is rotatably positioned on the angled portion 222 and configured to drive a plunger assembly 230 in a reciprocating motion. The drive shaft 220 is supported at one end by a needle bearing 221.

The plunger assembly 230 includes a plunger 232 which includes an inner wall which defines a rearward first diameter portion 234 and another inner wall which defines a second diameter portion 236 which has a smaller diameter than the first diameter portion 234. The first diameter portion 234 and the second diameter portion 236 are separated by a neck portion 238. The plunger 232 is slidingly supported by a rear bushing 240 positioned within the first diameter portion 234. An O-ring 242 provides a seal between the rear bushing 240 and the first diameter portion 234. A forward end portion 244 of the plunger 232 extends through the nose portion 208 and supports a chuck assembly 246. The plunger assembly 230 is movable along a plunger axis 248.

A counterweight 250 is slidingly and sealingly engaged within the second diameter portion 236 by one or more O-rings 252. A first fluid chamber 258 is defined by the first diameter portion 234, the rear bushing 240, and the neck portion 238. A second fluid chamber 260 is defined by the second diameter portion 236, the counterweight 250, and the neck portion 238. The portion of the plunger 232 forward of the counterweight 250 is vented to atmosphere by a vent 262. In some embodiments, a dust filter (not shown) is provided for the vent 262.

Operation of the reciprocating saw 200 in one embodiment is substantially the same as the operation of the reciprocating saw 100 up to the initial movement of the plunger 232 along the plunger axis 248 in the direction of the arrow 270 of FIG. 4. As the plunger 232 moves from its most rearward location as depicted in FIG. 4, the volume of the first fluid chamber 258 is increased. Because the first fluid chamber 258 is sealed at one end by the rear bushing 236, the pressure within the first fluid chamber 258 is decreased.

Fluid within the second fluid chamber 260 is allowed to flow into the first fluid chamber 258 through the neck portion 238 which functions as a fluid port as indicated by the arrow 272. The counterweight 250, however, provides a seal against fluid flow. Accordingly, the pressure within the second fluid chamber 260 is decreased. The pressure within the plunger 232 forward of the counterweight 250, however, remains constant since the second diameter portion 236 forward of the counterweight 250 is substantially open to atmosphere through the vent 262. A pressure difference is thus created across the counterweight 250 which forces the counterweight 250 to move in the direction of the arrow 274, directly opposite to the arrow 270. Since the volume of the first fluid chamber 258 is increasing, the counterweight 250 is forced to move so as to reduce the volume of the second fluid chamber 260. Thus, the combined volume of the first fluid chamber 258 and the second fluid chamber 260 remains constant.

Figure 5:
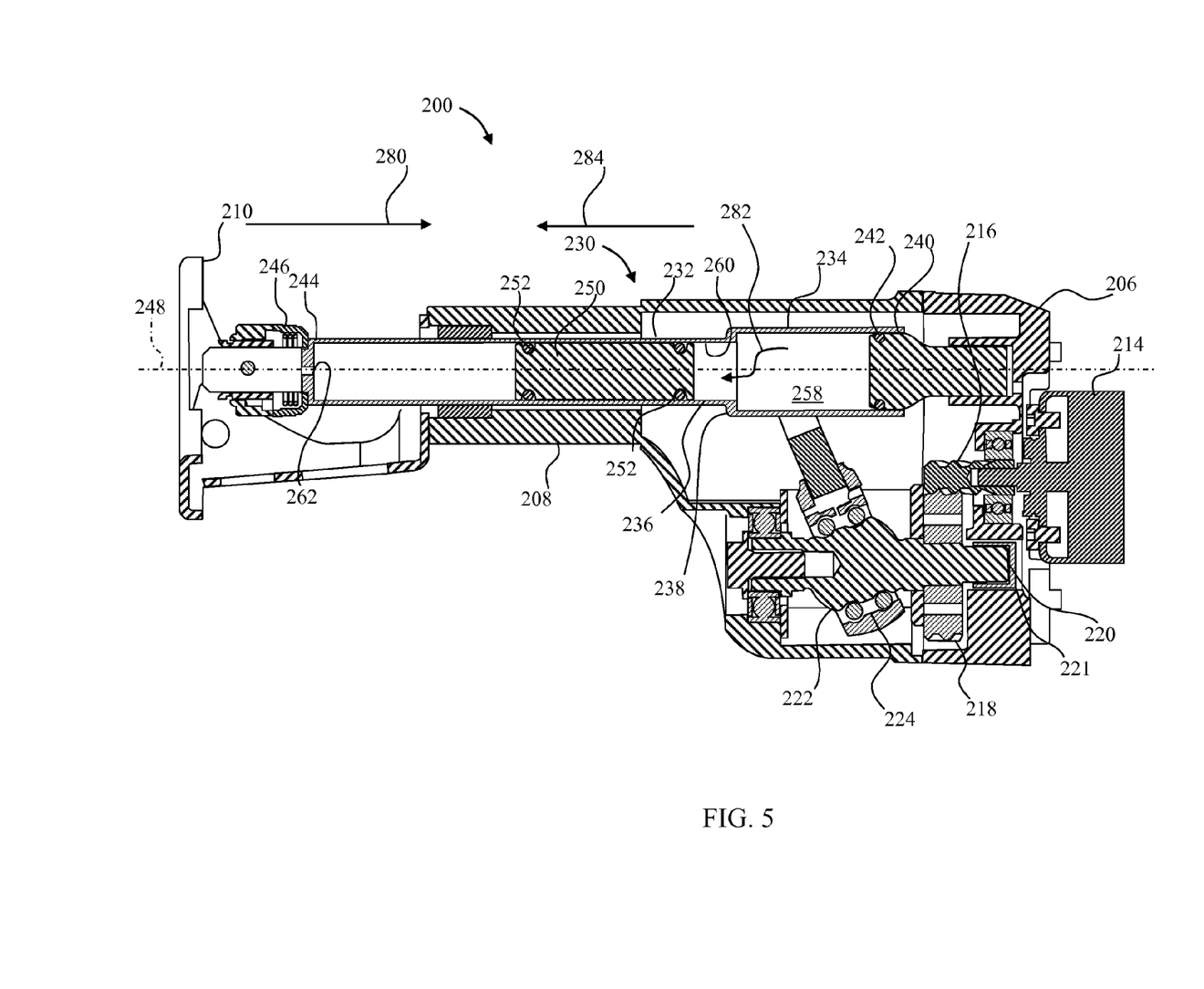
FIG. 5 depicts a side cross-sectional view of the tool of FIG. 4 with the plunger assembly in a forward position.

The above described sequence continues until the reciprocating tool 200 is in the configuration of FIG. 5. In FIG. 5, the wobble plate assembly 224 has forced the plunger assembly 230 to its most forward position, while the counterweight 250 has been forced rearwardly to its most rearward position. As the motor 214 continues to rotate, the above described movement of the wobble plate assembly 224 and the plunger assembly 230 is reversed. As the plunger 232 moves in the direction of the arrow 280, the volume of the first fluid chamber 258 is decreased. Because the first fluid chamber 258 is sealed at one end by the rear bushing 236, the pressure within the first fluid chamber 258 is increased.

Fluid within the first fluid chamber 258 is allowed to flow into the lower pressure volume of the second fluid chamber 260 through the neck portion 238 which functions as a fluid port as indicated by the arrow 282. The counterweight 250, however, provides a seal against fluid flow. Accordingly, the pressure within the second fluid chamber 260 is increased. The pressure within the plunger 232 forward of the counterweight 250, however, remains constant since the second diameter portion 236 forward of the counterweight 250 is substantially open to atmosphere through the vent 262. A pressure difference is thus created across the counterweight 250 which forces the counterweight 250 to move in the direction of the arrow 284, directly opposite to the arrow 280. Thus, the vibration of the plunger assembly 230 is offset by movement of the counterweight 250.

Figure 6:
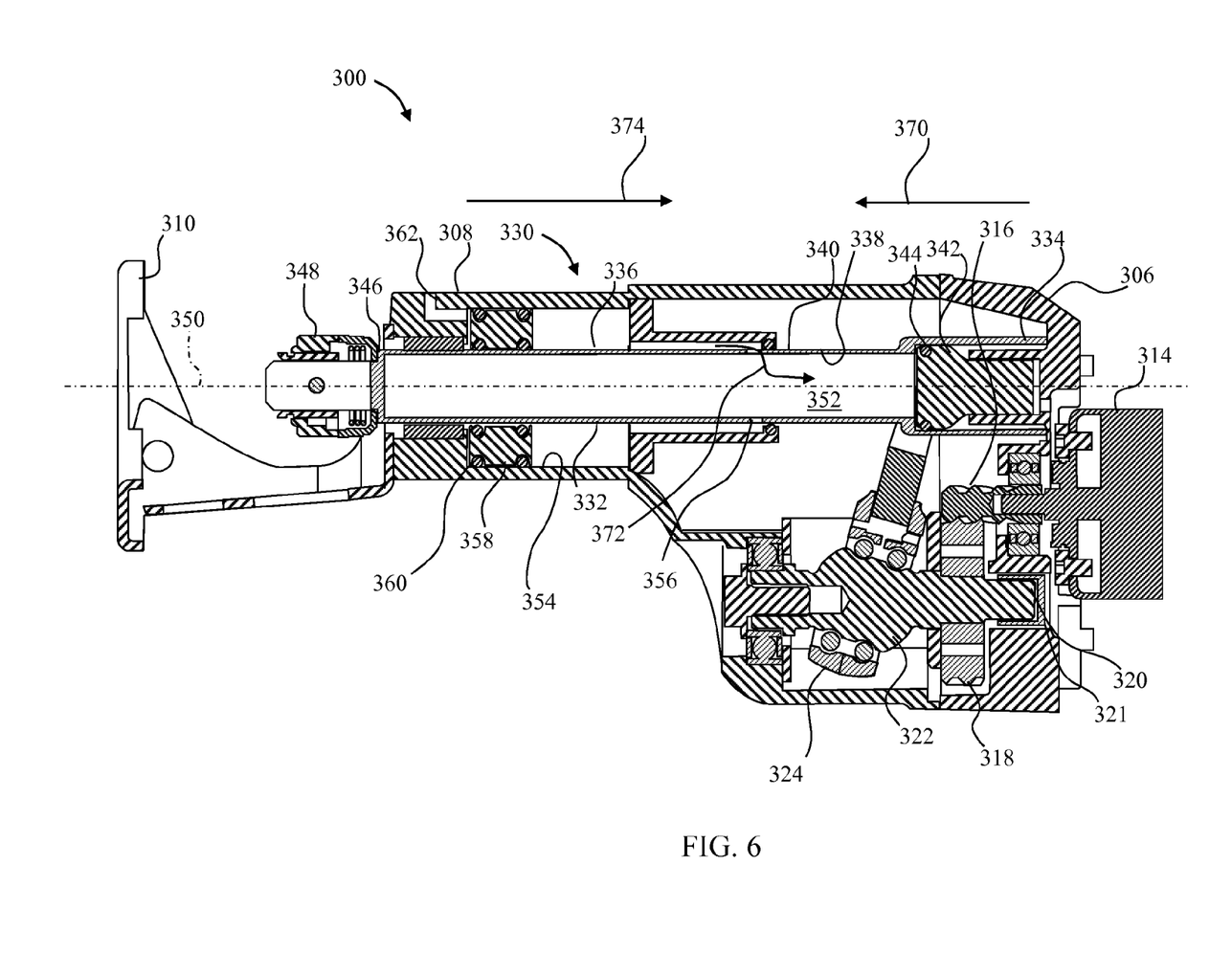
FIG. 6 depicts a side cross-sectional view of a reciprocating tool showing one variable volume fluid chamber within a plunger with the plunger assembly in a rearward position and a counterweight located outside of the plunger.

FIG. 6 depicts a portion of a reciprocating saw 300 which is also similar to the reciprocating saw 100. Like the reciprocating saw 100, the reciprocating saw 300 includes a motor housing portion 306, and a nose housing portion 308. A foot plate assembly 310 is located forwardly of the nose portion 308. A motor 314 rotatably drives an output shaft 316 which is engaged with a gear 318. The gear 318 is fixedly connected to a drive shaft 320 which includes an angled portion 322. A wobble plate assembly 324 is rotatably positioned on the angled portion 322 and configured to drive a plunger assembly 330 in a reciprocating motion. The drive shaft 320 is supported at one end by a needle bearing 321.

The plunger assembly 330 includes a plunger 332 which includes a rearwardly located large diameter portion 334 and a more forwardly located smaller diameter portion 336. The smaller diameter portion 336 includes an inner wall 338 and an outer wall 340. The plunger 332 is slidingly supported by a rear bushing 342 positioned within the large diameter portion 334. An O-ring 344 provides a seal between the rear bushing 340 and the large diameter portion 334. A forward end portion 346 of the plunger 332 extends through the nose portion 308 and supports a chuck assembly 348. The plunger assembly 330 is movable along a plunger axis 350.

The inner wall 338 and the rear bushing 342 define a first fluid chamber 352 which is connected to a second fluid chamber 354 by one or more fluid ports 356. The second fluid chamber 354 is defined by the outer wall 340, the nose portion housing 308, and a counterweight 358 which is slidingly and sealingly engaged with both the outer wall 340 and the nose portion housing 308 by one or more O-rings 360. The area forward of the counterweight 358 and between the outer wall 340 and the nose portion housing 308 is vented to atmosphere through a vent 362. In some embodiments, an air filter (not shown) is located on the vent 362.

Operation of the reciprocating saw 300 in one embodiment is substantially the same as the operation of the reciprocating saw 100 up to the initial movement of the plunger 332 along the plunger axis 350 in the direction of the arrow 370 of FIG. 6. As the plunger 332 moves from its most rearward location as depicted in FIG. 6, the volume of the first fluid chamber 352 is increased. Because the first fluid chamber 352 is sealed at one end by the rear bushing 342, the pressure within the first fluid chamber 352 is decreased.

Fluid within the second fluid chamber 354 is allowed to flow into the lower pressure first fluid chamber 352 through the fluid port 356 as indicated by the arrow 372. The counterweight 358, however, provides a seal against fluid flow. Accordingly, the pressure within the second fluid chamber 354 is decreased. The pressure within the space between the outer wall 340 and the nose portion housing 308 forward of the counterweight 358, however, remains constant since the space between the outer wall 340 and the nose portion housing 308 is substantially open to atmosphere through the vent 362. A pressure difference is thus created across the counterweight 358 which forces the counterweight 358 to move in the direction of the arrow 374, directly opposite to the arrow 370. Since the volume of the first fluid chamber 352 is increasing, the counterweight 358 is forced to move so as to reduce the volume of the second fluid chamber 354. Thus, the combined volume of the first fluid chamber 352 and the second fluid chamber 354 remains constant.

Figure 7:
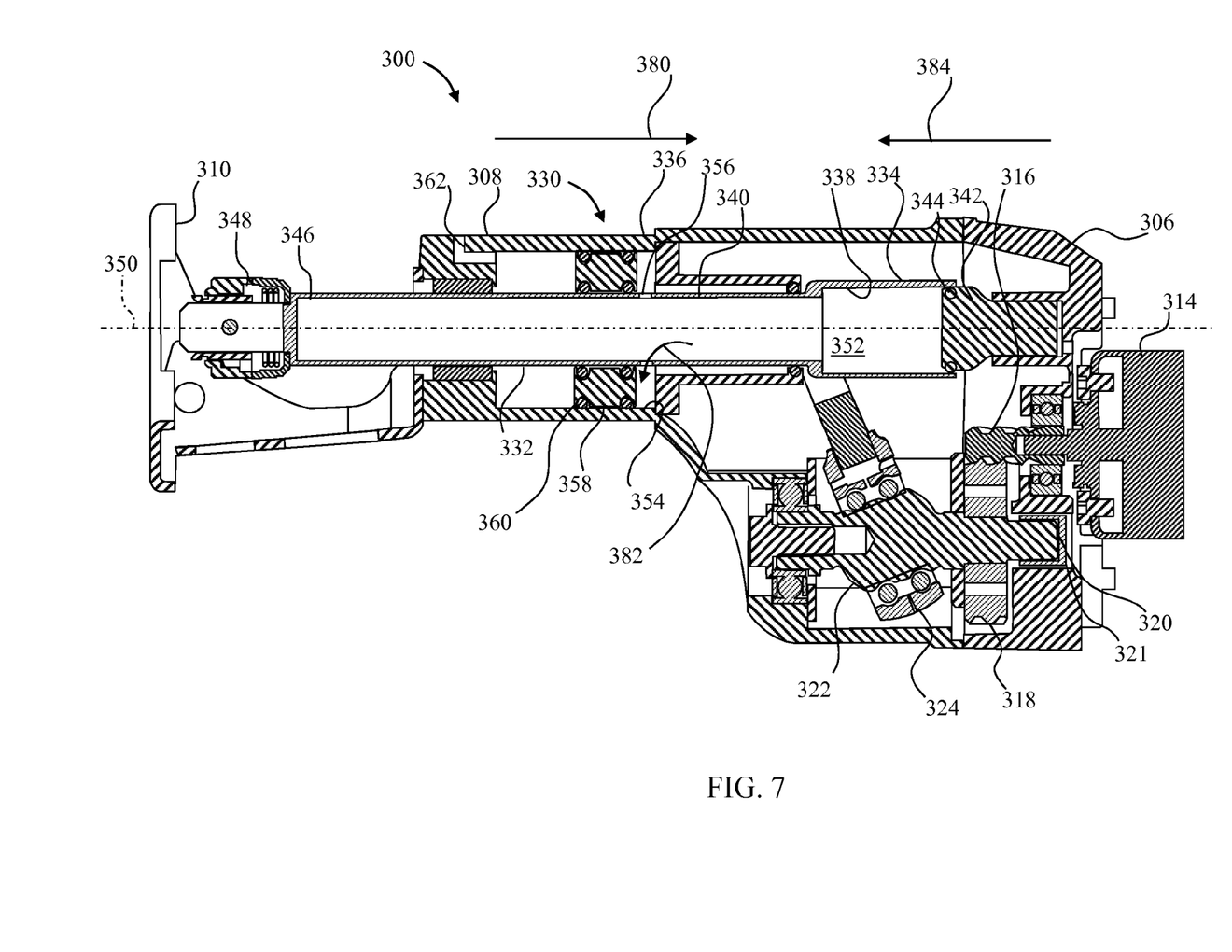
FIG. 7 depicts a side cross-sectional view of the tool of FIG. 6 with the plunger assembly in a forward position.

The above described sequence continues until the reciprocating tool 300 is in the configuration of FIG. 7. In FIG. 7, the wobble plate assembly 324 has forced the plunger assembly 330 to its most forward position, while the counterweight 358 has been forced rearwardly to its most rearward position. As the motor 314 continues to rotate, the above described movement of the wobble plate assembly 324 and the plunger assembly 330 is reversed. As the plunger 332 moves in the direction of the arrow 380, the volume of the first fluid chamber 352 is decreased. Because the first fluid chamber 352 is sealed at one end by the rear bushing 342, the pressure within the first fluid chamber 352 is increased.

Fluid within the first fluid chamber 352 is allowed to flow into the lower pressure second fluid chamber 354 through the fluid port 356 as indicated by the arrow 382. The counterweight 358, however, provides a seal against fluid flow. Accordingly, the pressure within the second fluid chamber 354 is increased. The pressure within the space between the outer wall 340 and the nose portion housing 308 forward of the counterweight 358, however, remains constant since the space between the outer wall 340 and the nose portion housing 308 forward of the counterweight 358 is substantially open to atmosphere through the vent 362. A pressure difference is thus created across the counterweight 358 which forces the counterweight 358 to move in the direction of the arrow 384, directly opposite to the arrow 380. Thus, the vibration of the plunger assembly 330 is offset by movement of the counterweight 358.

Figure 8:
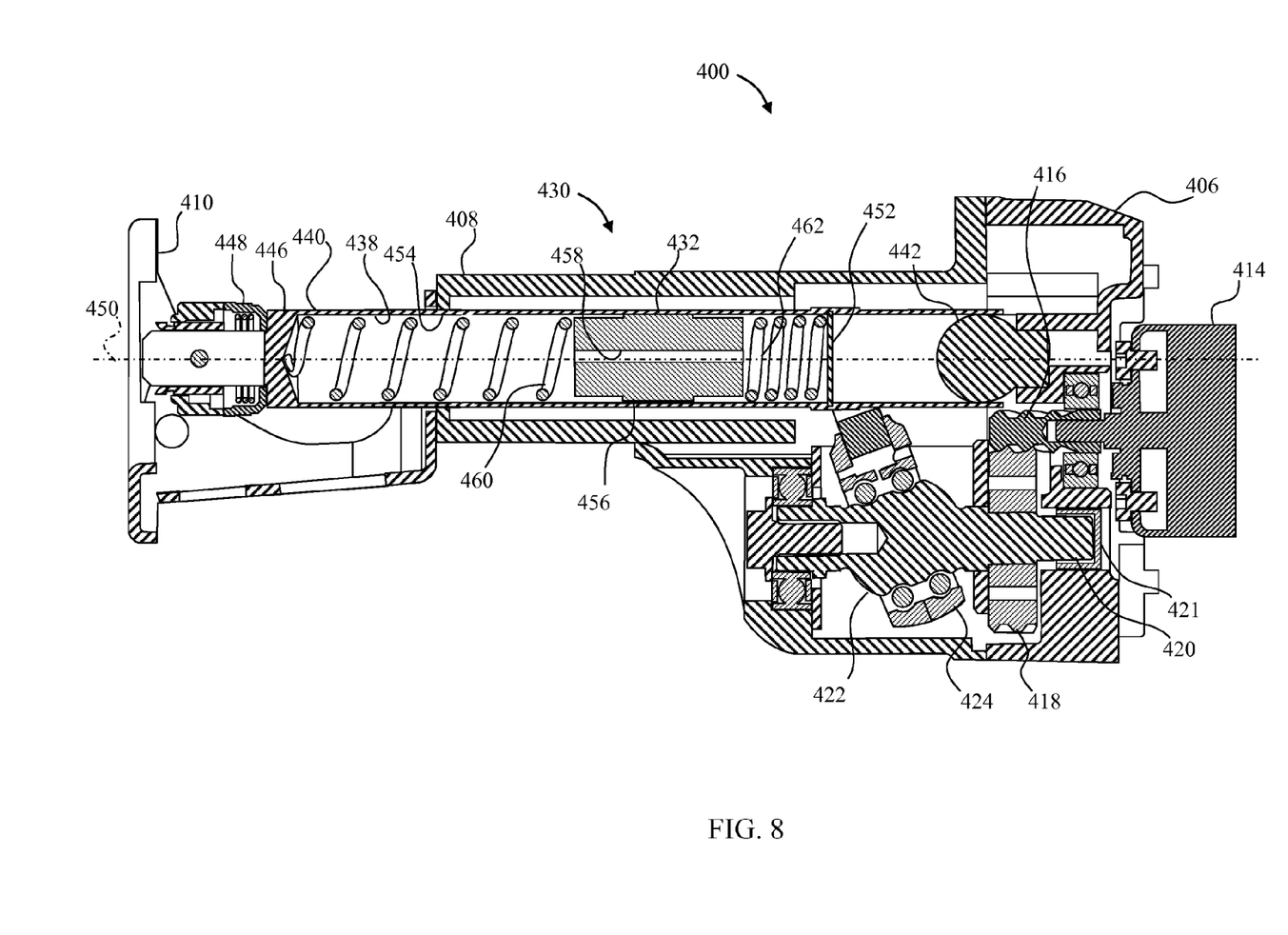
FIG. 8 depicts a side cross-sectional view of a reciprocating tool showing two springs positioned on opposite sides of a counterweight positioned within a plunger and configured as a tuned mass damper.

FIG. 8 depicts a portion of a reciprocating saw 400 which also provides vibration reduction. Like the reciprocating saw 100, the reciprocating saw 400 includes a motor housing portion 406, and a nose housing portion 408. A foot plate assembly 410 is located forwardly of the nose portion 408. A motor 414 rotatably drives an output shaft 416 which is engaged with a gear 418. The gear 418 is fixedly connected to a drive shaft 420 which includes an angled portion 422. A wobble plate assembly 424 is rotatably positioned on the angled portion 422 and configured to drive a plunger assembly 430 in a reciprocating motion. The drive shaft 420 is supported at one end by a needle bearing 421.

The plunger assembly 430 includes a plunger 432 which includes an inner wall 438 and an outer wall 440. The plunger 432 is slidingly supported by a rear bushing 442. A forward end portion 446 of the plunger 432 extends through the nose portion 408 and supports a chuck assembly 448. The plunger assembly 430 is movable along a plunger axis 450.

A retaining clip 452 defines a chamber 454 within the plunger 432. A counterweight 456 is located within the chamber 454. A vent 458 extends along the length of the counterweight 456. A first spring 460 is located within the chamber 454 and forwardly of the counterweight 456 while a second spring 462 is located within the chamber 454 and rearwardly of the counterweight 456.

Operation of the reciprocating saw 400 in one embodiment is substantially the same as the operation of the reciprocating saw 100. The main difference is that as the springs 460/462 and the counterweight 456 function as a tuned mass damper. Accordingly, the mass of the counterweight 456 and the spring constants of the springs 460/462 are selected to define a desired mass-spring system with a predetermined natural frequency. The predetermined natural frequency is selected to match the value of the stroke rate of the reciprocating tool 400. For variable speed tools, the selected frequency is selected in some embodiments to be a nominal value within the typical range of stroke rates.

Consequently, when the plunger 432 moves along the axis 450, the counterweight 456 oscillates out-of-phase with the movement of the plunger 432 thereby cancelling or absorbing some of the forces used to accelerate and decelerate the plunger 432. The vent 458 provides for movement of air from one side of the counterweight 456 to the other side of the counterweight 456 to preclude undesired damping of movement of the counterweight 456.

While the tuned mass system in the embodiment of FIG. 8 is located within the plunger 432, in other embodiments the counterweight and springs are located outside of the plunger. By positioning the system within the plunger 432, however, a hollow space which has traditionally been dead space is utilized thereby reducing the bulk of the tool 400.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected. By way of example, while the above described embodiments incorporate wobble plate assemblies, other embodiments incorporate other drive assemblies which translate rotational movement to reciprocating movement. Such drive assemblies include scotch yoke mechanisms and crank slider assemblies. Moreover, while the above described plunger assemblies are configured to move substantially linearly, in other embodiments the plunger assemblies are configured to move in an orbital path along the plunge axis.

The invention claimed is:

1. A reciprocating tool comprising:
    a first variable volume fluid chamber;
    a second variable volume fluid chamber in fluid communication with the first variable volume fluid chamber within the reciprocating tool via a fluid port within the reciprocating tool;
    a plunger configured to modify the volume of the first variable volume fluid chamber by movement generally in a first direction along a plunge axis such that a portion of a fluid moves from one of the first and second variable volume fluid chamber to the other of the first and second variable volume fluid chamber;
    a counterweight configured such that the movement of the portion of the fluid results in a movement of the counterweight generally in a second direction along the plunge axis, the second direction opposite to the first direction; and
    a chuck assembly supported by the plunger.
2. The tool of claim 1, wherein:
    the plunger comprises a first inner wall; and at least one of the first variable volume fluid chamber and the second variable volume fluid chamber is defined in part by the first inner wall.

3. The tool of claim 2, wherein:
the first variable volume fluid chamber is defined in part by the first inner wall;
the plunger comprises a second inner wall; and
the second variable volume fluid chamber is defined in part by the second inner wall.

4. The tool of claim 3, further comprising:
a neck portion located between the first variable volume fluid chamber and the second variable volume fluid chamber.

5. The tool of claim 4, further comprising:
a rear bushing slidingly and sealingly engaged with the first inner wall.

6. The tool of claim 2, wherein:
the counterweight is located within the plunger; and
the counterweight is sealingly and slidingly engaged with the first inner wall.

7. The tool of claim 6, wherein:
the plunger comprises an outer wall;
the fluid port extends between the first inner wall and the outer wall;
the second fluid chamber is defined in part by the inner wall; and
the first fluid chamber is defined in part by the outer wall.

8. The tool of claim 7, further comprising:
a wiper flange extending outwardly from the outer wall and defining in part the first fluid chamber.

9. The tool of claim 8, further comprising:
a rear bushing supporting the plunger and including an air vent extending therethrough.

10. The tool of claim 2, wherein:
the plunger comprises an outer wall; and
the counterweight is sealingly and slidingly engaged with the outer wall.

11. The tool of claim 10, wherein:
the fluid port extends between the first inner wall and the outer wall;
the second fluid chamber is defined in part by the outer wall; and
the first fluid chamber is defined in part by the inner wall.

12. The tool of claim 11, further comprising:
a rear bushing slidingly and sealingly engaged with the plunger.

13. A reciprocating tool comprising:
a first variable volume fluid chamber;
a second variable volume fluid chamber in fluid communication with the first variable volume fluid chamber within the reciprocating tool through a fluid port within the reciprocating tool;
a plunger configured to modify the volume of the first variable volume fluid chamber by movement generally in a first direction along a plunge axis such that a portion of a fluid moves from one of the first and second variable volume fluid chamber to the other of the first and second variable volume fluid chamber;
a drive assembly configured to force the plunger along the plunge axis; and
a counterweight configured such that the movement of the portion of the fluid results in a movement of the counterweight generally in a second direction along the plunge axis, the second direction opposite to the first direction.

14. The tool of claim 13, wherein the counterweight defines, in part, one of the chambers.

15. The tool of claim 14, wherein:
the plunger includes an inner wall and an outer wall; and
the fluid port extends between the inner wall and the outer wall.

16. The tool of claim 14, wherein the counterweight is located within the plunger.

17. The tool of claim 14, wherein the first fluid chamber is defined in part by a rear bushing sealingly and slidingly engaged with the plunger.

18. The tool of claim 14 wherein the drive assembly is one of a wobble plate assembly, a scotch yoke assembly, and a crank slider.

19. The tool of claim 14, wherein the first fluid chamber is located inside of the plunger.

20. The tool of claim 13, wherein the drive assembly is configured to force the plunger in an orbital path along the plunge axis.

* * * * *